(12) United States Patent
Cave et al.

(10) Patent No.: US 7,826,431 B2
(45) Date of Patent: Nov. 2, 2010

(54) METHOD OF SELECTIVELY ADJUSTING THE CONFIGURATION OF AN ACCESS POINT ANTENNA TO ENHANCE MOBILE STATION COVERAGE

(75) Inventors: Christopher Cave, Candiac (CA); Vincent Roy, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 1299 days.

(21) Appl. No.: 10/875,122

(22) Filed: Jun. 23, 2004

(65) Prior Publication Data

US 2005/0254513 A1    Nov. 17, 2005

Related U.S. Application Data

(60) Provisional application No. 60/571,277, filed on May 14, 2004.

(51) Int. Cl.
    *H04W 4/00* (2009.01)
(52) U.S. Cl. .............. 370/338; 370/445; 455/562.1
(58) Field of Classification Search .......... 370/349, 370/445, 328, 335, 347, 338; 455/446, 447, 455/450, 562, 562.1
    See application file for complete search history.

(56) References Cited

U.S. PATENT DOCUMENTS

| | | | | |
|---|---|---|---|---|
| 5,134,715 | A * | 7/1992 | Parl et al. | 455/64 |
| 5,661,723 | A * | 8/1997 | Ueno et al. | 370/315 |
| 5,889,772 | A * | 3/1999 | Fischer et al. | 370/346 |
| 6,404,756 | B1 * | 6/2002 | Whitehill et al. | 370/338 |
| 7,035,652 | B1 * | 4/2006 | Kelkar | 455/456.6 |
| 2002/0158801 | A1 | 10/2002 | Crilly, Jr. et al. | |
| 2002/0172186 | A1 * | 11/2002 | Larsson | 370/349 |
| 2002/0184389 | A1 * | 12/2002 | Sherman | 709/245 |

(Continued)

FOREIGN PATENT DOCUMENTS

JP    2003-018074    1/2003

(Continued)

OTHER PUBLICATIONS

Crow et al., "IEEE 802.11 Wireless Local Area Networks," IEEE Communications Magazine, vol. 35, Issue 9, Sep. 1997, pp. 116-126.

(Continued)

*Primary Examiner*—Ricky Ngo
*Assistant Examiner*—Kan Yuen
(74) *Attorney, Agent, or Firm*—Volpe and Koenig, P.C.

(57) ABSTRACT

A wireless communication system includes a plurality of wireless transmit/receive units (WTRUs) and an access point (AP). The AP communicates with the WTRUs via an antenna. In one embodiment, the AP configures the antenna to a wide beam configuration that covers a desired service area and transmits a Request-To-Send (RTS) control message. When the AP receives a Clear-To-Send (CTS) control message from one of the WTRUs, the AP determines optimal antenna settings for communication with the one WTRU. The AP configures the antenna to a narrow beam configuration and transmits at least one data packet to the one WTRU. When the AP receives an acknowledgement message indicating that the data packet was successfully received by the WTRU, the AP configures the antenna to the wide beam configuration. In another embodiment, the AP is configured to transmit and receive data packet fragments from the WTRUs and configure the antenna accordingly.

6 Claims, 5 Drawing Sheets

U.S. PATENT DOCUMENTS

| | | | |
|---|---|---|---|
| 2003/0104848 A1* | 6/2003 | Brideglall | 455/574 |
| 2004/0002357 A1 | 1/2004 | Benveniste | |
| 2004/0037258 A1 | 2/2004 | Scherzer et al. | |
| 2004/0053601 A1* | 3/2004 | Frank et al. | 455/411 |
| 2004/0170194 A1* | 9/2004 | Moreton | 370/474 |
| 2004/0181692 A1* | 9/2004 | Wild et al. | 713/201 |
| 2005/0075140 A1* | 4/2005 | Famolari | 455/562.1 |
| 2005/0096091 A1* | 5/2005 | Sharony | 455/562.1 |
| 2005/0111416 A1* | 5/2005 | Ginzburg | 370/338 |

FOREIGN PATENT DOCUMENTS

JP   2003-163669   6/2003

OTHER PUBLICATIONS

Crow et al., "IEEE 802.11 Wireless Local Area Networks," IEEE Communications Magazine, vol. 35, Issue 9, Sep. 1997, pp. 116-126.
Crow, et al., "IEEE 802.11 Wireless Local Area Networks," IEEE Communications Magazine, vol. 35, Issue 9, pp. 116-126, Sep. 1997.
Crow, et al., "IEEE 802.11 Wireless Local Area Networks," IEEE Communications Magazine, vol. 35, Issue 9, pp. 116-126, Sep. 1997.

* cited by examiner

METHOD OF SELECTIVELY ADJUSTING THE CONFIGURATION OF AN ACCESS POINT ANTENNA TO ENHANCE MOBILE STATION COVERAGE

CROSS REFERENCE TO RELATED APPLICATION(S)

This application claims priority from U.S. provisional application No. 60/571,277, filed May 14, 2004, which is incorporated by reference as if fully set forth.

FIELD OF THE INVENTION

The present invention relates to the field of wireless communications. More specifically, the present invention relates to the control of antenna radiation patterns in a wireless communication system.

BACKGROUND

In a Wireless Local Area Network (WLAN) system, the Distributed Coordination Function (DCF) is the fundamental access method used to support asynchronous data transfer on a best effort basis. The DCF mode of a WLAN system is used to support contention services promoting fair access to the channel for all stations. The multiple access scheme used to achieve these services is Carrier Sense Multiple Access with Collision Avoidance (CSMA/CA). One way by which stations detect if the channel is busy is by analyzing all detected packets that are sent by other WLAN users and by detecting activity in the channel via relative signal strength from other sources.

Referring to FIG. 1, a wireless communication system 100 includes an Access Point (AP) 105 in communication with a plurality of wireless transmit/receive units (WTRUs), i.e., stations, terminals, 110, 115 and 120. Two WTRUs that are within the coverage area of the AP 105 but outside the coverage area of each other are said to be hidden from each other. If two WTRUs are "hidden" from each other, the first WTRU cannot detect the signals sent by the second WTRU, thus disabling the "collision avoidance" capabilities of both WTRUs in regards to each other.

The WLAN protocol uses a Request-To-Send/Clear-To-Send (RTS/CTS) handshaking mechanism to combat the effects of collisions. By the same account, RTS/CTS can be used to avoid the hidden terminal problem.

Referring to FIG. 2, when RTS/CTS is used, a source WTRU, wishing to transmit a frame, sends an RTS message 205 after the expiration of a Distributed Interframe Space (DIFS) 210 indicating the duration the WTRU needs to transmit its packet. If the destination WTRU successfully receives the RTS message 205, the destination WTRU responds, after the expiration of a Short Interframe Space (SIFS) 215, with a CTS message 220 confirming that the source WTRU is allowed to transmit, and reserving the channel for the transmission of data. The source WTRU then sends a data packet 225, and the destination WTRU then sends an acknowledgement (ACK) 230 to confirm successful reception of the data packet 225. Using this handshake mechanism, all WTRUs are likely to receive at least one of the two messages (i.e., RTS or CTS), since the AP 105 will transmit one of these two. Upon reception of the RTS and/or CTS messages, other WTRUs can set their network allocation vector (NAV) 235, 240, for the duration of the data transmission. A Contention Window (CW) 245 is then established prior to accessing the channel. This mechanism virtually ensures the source WTRU that the medium is reserved for the desired duration, thus solving the hidden terminal problem.

Referring to FIG. 3, the DCF mode of operation also supports fragmentation/reassembly of large media access control (MAC) Protocol Data Units (MPDUs). When the size of an MPDU exceeds a configurable threshold, it is divided into smaller fragments, with the receiver individually acknowledging each fragment. Only the first fragment is sent using the RTS/CTS mechanism. Moreover, the duration fields in the initial RTS/CTS messages only account for the first fragment. Duration information for subsequent fragments is determined by other WTRUs from the header of preceding fragments and acknowledgements (ACKs).

Increased demands for higher range and higher capacity from WLAN systems make the use of adaptive antennas attractive for such systems. Because of the cost associated with adaptive antenna technologies, the use of adaptive antennas is often perceived as being more attractive for the AP than for all WTRUs.

Typically, a smart antenna system uses an antenna array and forms directional beams to transmit and receive radio signals. As this added directivity helps to increase coverage and signal to noise ratio while reducing interference to neighboring Base Station Systems (BSSs), it also impairs the ability for a WTRU in a given beam to perform carrier sensing when the AP 105 transmits packets to WTRUs in other beams. In such a system, using the RTS/CTS handshaking mechanism does not mitigate the hidden terminal problem as WTRUs located in beams, other than the one in which the AP 105 transmits, have a low probability of detecting the RTS (in the case where the AP 105 is the source) or the CTS (when the AP 105 is the destination) sent by the AP 105.

For example, FIG. 1 shows a situation where WTRU 110 and 115, located in a beam 1, send and receive packets to/from the AP 105. Assuming that WTRU 120 is located outside the coverage limits of WTRU 110 and in a different beam (i.e., beam 5) than the beam that WTRUs 110 and 115 are in (i.e., beam 1), it will likely be unable to detect the packets sent by the AP 105 to WTRUs 110 and 115 in beam 1. This is referred to as the hidden beam problem and will result in a collision if WTRU 120 has data to transmit. Also, the fact that WTRU 120 is outside the coverage limits of WTRU 110 translates into a hidden terminal problem, which also results in the possibility of a collision. Thus, using an RTS and CTS handshake will not alleviate the hidden terminal or hidden beam problems because WTRU 120 would be unable to detect neither of the RTS or CTS messages sent by the WTRU 110 to the AP 105, nor those sent by the AP 105 to WTRU 110 or 115 through beam 1.

A method of successfully sending and receiving data packets without experiencing hidden terminal or hidden beam problems is highly desirable.

SUMMARY

The present invention is a method used in conjunction with a wireless communication system including a plurality of WTRUs and an AP.

In one embodiment, the AP is configured to transmit at least one data packet to one or more of the WTRUs via at least one antenna. The AP configures the antenna to a wide beam configuration that covers a desired service area. The AP transmits an RTS message to at least one of the WTRUs via the wide beam antenna configuration. The AP waits to receive a CTS message from the at least one WTRU via the wide beam antenna configuration. The AP determines optimal antenna settings for communication with the one WTRU. The AP then configures the antenna to a narrow beam configuration and transmits the at least one data packet to the at least one WTRU. The AP waits to receive an acknowledgement message indicating that the data packet was successfully received by the at least one WTRU. The AP then configures the antenna to the wide band configuration in response to receiving the acknowledgement message.

The system may be a WLAN system which provides services using CSMA/CA. The system may execute a transmission failure procedure if the AP does not receive the CTS control message. The AP may perform a MAC layer protocol to obtain channel access prior to transmitting the RTS control message.

In another embodiment, the AP is configured to transmit data packet fragments. The AP configures the antenna to a wide beam configuration that covers a desired service area. The AP transmits an RTS message to at least one of the WTRUs via the wide beam antenna configuration. The AP waits to receive a CTS message from the at least one WTRU via the wide beam antenna configuration. The AP transmits a first portion of a data packet fragment to the at least one WTRU via the wide beam antenna configuration. The AP configures the antenna to a narrow beam configuration and transmits a second portion of the data packet fragment via the narrow beam antenna configuration.

The AP may configure the antenna to a wide beam configuration after the AP transmits the second portion of the data packet fragment. The AP waits to receive an acknowledgement message indicating receipt of the data packet fragment by the at least one WTRU. If the AP receives the acknowledgement message and there are more data packet fragments available to be processed, the process is repeated.

The system may implement a transmission failure procedure if the AP does not receive the acknowledgement message. The first portion of the data packet fragment may include a preamble, a PLCP header and a MAC header.

In yet another embodiment, the AP is configured to receive data packet fragments. The AP receives an RTS control message sent from at least one of the WTRUs. The AP configures the antenna to a wide beam configuration. The AP transmits a CTS control message to the at least one WTRU via the wide beam antenna configuration. The AP configures the antenna to a narrow beam configuration. The AP waits to receive a data packet fragment via the narrow beam antenna configuration. The AP configures the antenna to a wide beam configuration if the data packet fragment is successfully received. The AP sends an acknowledgement message to the at least one WTRU indicating that the data packet fragment was successfully received.

The AP may configure the antenna to a wide beam configuration if the data packet fragment is not successfully received. The system may execute a reception failure procedure. If there are more data packet fragments available to be processed, the process is repeated.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENT(S)

Figure 1:
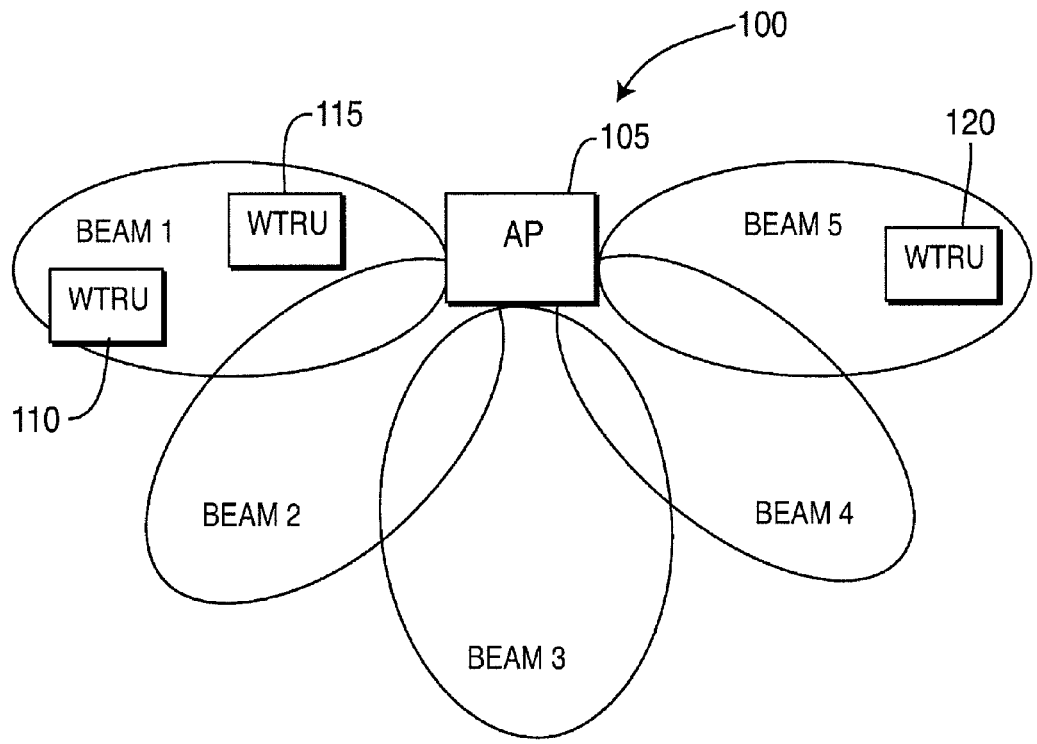
FIG. 1 is a wireless communication system into which the present invention is incorporated.
Figure 2:
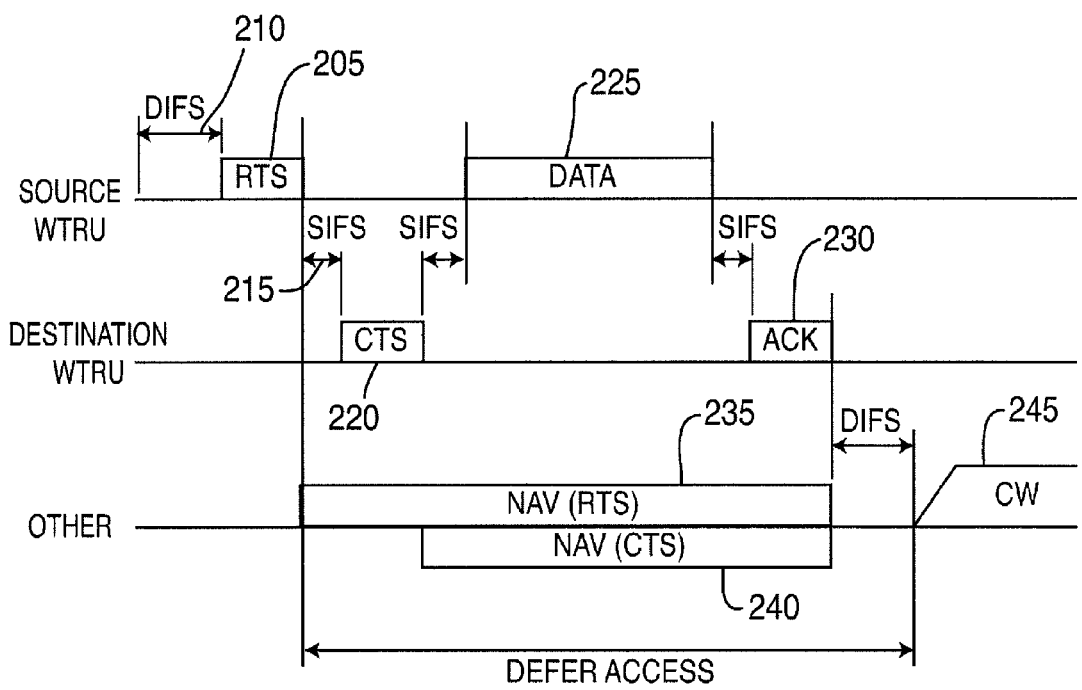
FIG. 2 illustrates transmission using a RTS/CTS mechanism.
Figure 3:
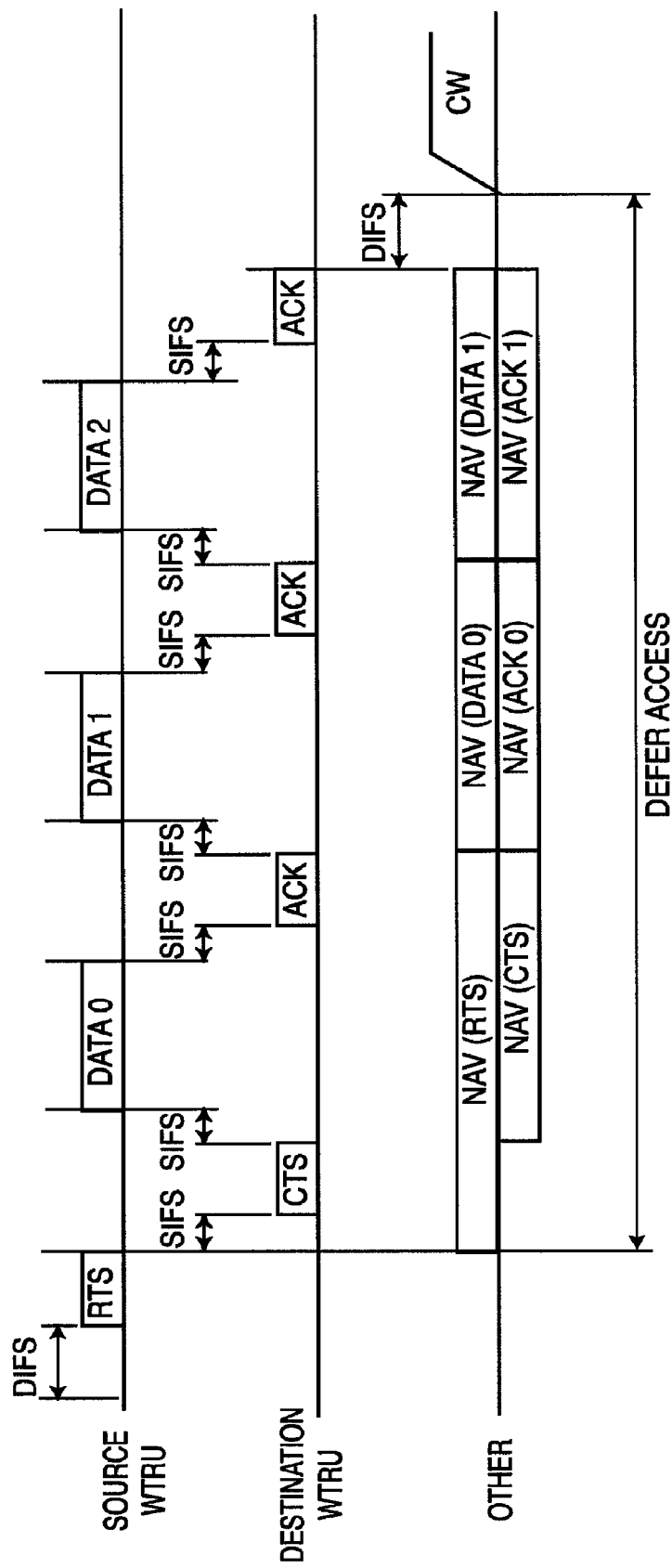
FIG. 3 illustrates transmission using a RTS/CTS mechanism and fragmentation.

The preferred embodiments will be described with reference to the drawing figures where like numerals represent like elements throughout.

Preferably, the method and system disclosed herein uses one or more wireless transmit/receive units (WTRU). Hereafter, a WTRU includes but is not limited to a user equipment, mobile station, fixed or mobile subscriber unit, pager, or any other type of device capable of operating in a wireless environment.

The present invention is a method by which an access point, which is equipped with an adaptive antenna system, widens its radiation pattern when transmitting RTS, CTS and ACK packets and uses more directive patterns when transmitting and/or receiving data packets. In the case where fragmentation is used, only initial parts of the PPDU that include duration information are transmitted using a widened radiation pattern.

It is assumed that the AP 105 is equipped with an adaptive antenna system that is capable of focusing its radiation pattern for transmission and/or reception to/from a specific area within the overall serviced area, i.e. the cell. Moreover, the AP 105 is capable of configuring its adaptive antenna system to a wide radiation pattern for transmission and/or reception, which covers the entire area of service of the cell. The widening of the radiation pattern can be achieved through various methods that include, but are not limited to, using a distinct omnidirectional antenna or adjusting beamforming taps to allow homogenous coverage in all directions. The AP 105 determines the optimal radiation pattern for transmission/reception to/from the WTRU while receiving transmissions from the WTRU using its wide beam. For example, the AP 105 can use angle-of-arrival measurements on the received packet to determine a narrow beam radiation pattern.

In its default state, the antenna of the AP 105 should be configured to a wide pattern that covers the entire area of the serviced cell. As such, an idle AP 105 can detect and receive transmissions from any WTRU located within its coverage area.

When the AP 105 has data to transmit to a WTRU and a narrow beam is to be used, the AP 105 employs the RTS/CTS handshake mechanism. The initial RTS packet is transmitted using a wide beam. Upon reception of the CTS packet from the destination WTRU, the AP 105 configures its smart antenna and transmits the data packet using the narrow beam. Note that the AP 105 can estimate the optimal antenna parameters for transmission to the WTRU based on the CTS packet that was received from the WTRU.

Figure 4:
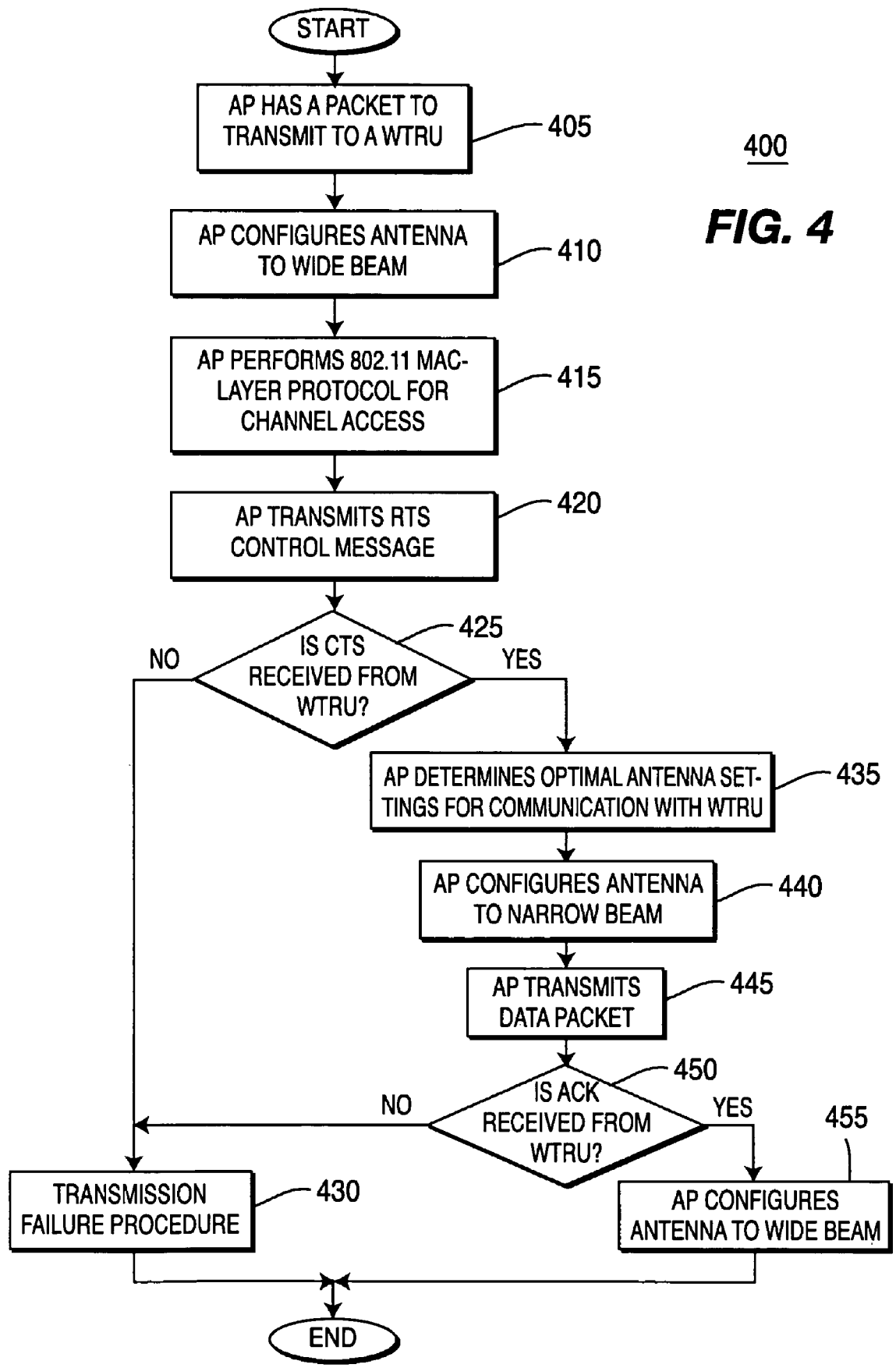
FIG. 4 is a flow chart depicting method steps used to implement AP transmission in the system of FIG. 1 using a RTS/CTS mechanism without fragmentation in accordance with the present invention.

FIG. 4 is a flowchart of a process 400 including method steps used to implement AP transmission using the RTS/CTS mechanism in accordance with the present invention. The transmission failure procedure that is shown in the flowchart is implementation dependent and out of the scope of the invention. Typically, an AP will reattempt the transmission of the data packet, following the same procedure as the initial attempt, up to a maximum number of transmission attempts.

The RTS/CTS handshake mechanism introduces significant overhead for very small data packets. As such, the use of RTS/CTS with beamforming can be determined based on the size of the data packet, e.g. threshold based. More specifically, small data packets can be transmitted directly using the wide beam, whereas larger data packets can be transmitted according to the procedure described in FIG. 4.

Referring to the process 400 of FIG. 4, the present invention solves the hidden beam problem described above. In step 405, when an AP 105 wants to send a packet to either WTRU 110 or 115, located in one specific beam, the AP 105 configures its antenna to a wide beam default (step 410) and performs an 802.11 MAC-layer protocol for channel access (step 415). The AP 105 transmits an RTS control message to the WTRU (step 420) using a wide radiation pattern to ensure that every user in the cell can detect it. Every user within the cell is informed of the duration for which the channel is reserved, which is indicated in the RTS control message. This avoids a collision between WTRU 120 located outside the beam in which the destination WTRU 110 or 115 are located.

Referring still to FIG. 4, in step 425, the AP 105 waits to receive a CTS control message from the at least one WTRU via the wide beam antenna in response to the RTS control message. If a CTS message is not received by the AP 105, a transmission failure procedure is implemented (step 430). If a CTS message is received, the AP 105 determines optimal antenna settings for communication with the WTRU (step 435). The AP 105 then configures the antenna to a narrow beam configuration (step 440) and transmits the data packet to the WTRU (step 445). In step 450, the AP 105 waits to receive an ACK message indicating that the data packet was successfully received by the WTRU. If an ACK message is not received by the AP 105, a transmission failure procedure is implemented (step 430). If an ACK message is received, the AP 105 configures the antenna back to the wide beam configuration in step 455.

If fragmentation of the data packet is used, the RTS/CTS control packets only provide duration information for the first fragment. Duration information for subsequent packets is conveyed in the MAC header of preceding fragments and their ACKs. Following the reception of the CTS message from the destination WTRU, the AP 105 uses the beamforming capabilities of its smart antenna to transmit the remaining portion of the packet, reducing the interference to neighboring cells and improving its transmission range.

Figure 5:
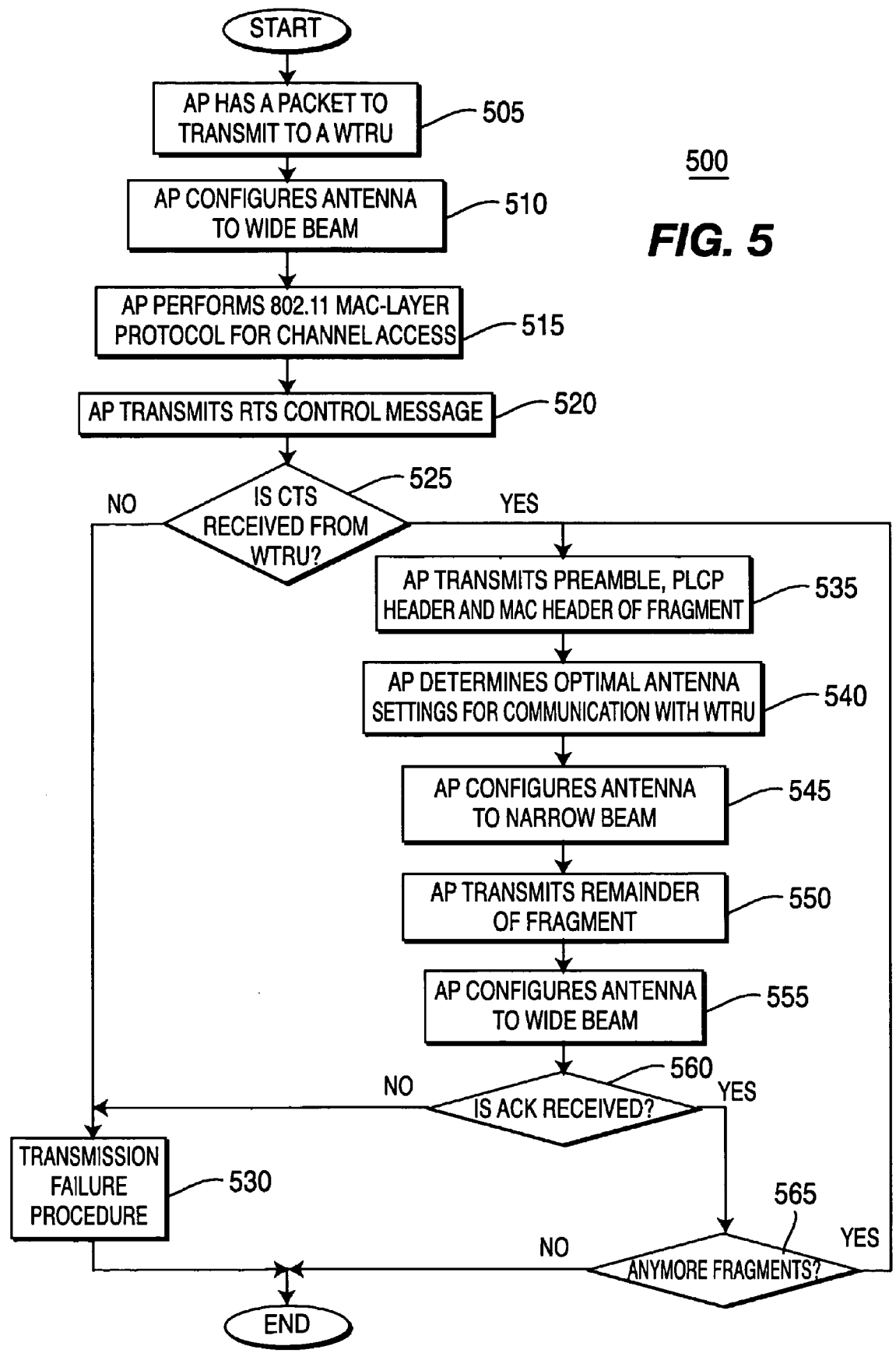
FIG. 5 is a flow chart depicting method steps used to implement AP transmission in the system of FIG. 1 using a RTS/CTS mechanism with fragmentation in accordance with the present invention.

FIG. 5 is a flow chart of a process 500 including method steps used to implement AP transmission using a RTS/CTS mechanism with fragmentation in accordance with the present invention. As in the previous case, the RTS packet is transmitted using the wide beam. However, when fragmentation is used, the AP 105 transmits the Preamble, Physical Layer Convergence Protocol (PLCP) Header and MAC Header of a data packet (i.e., fragment) using the wide beam. The remainder of each fragment is transmitted using the narrow beam.

In step 505, when an AP 105 is ready to send a packet to either WTRU 110 or 115, located in one specific beam, the AP 105 configures its antenna to a wide beam default (step 510) and performs an 802.11 MAC-layer protocol for channel access (step 515). The AP 105 transmits an RTS control message to the WTRU (step 520) using a wide radiation pattern to ensure that every user in the cell can detect it. In step 525, the AP 105 waits to receive a CTS control message from the WTRU via the wide beam antenna configuration in response to the RTS control message. If a CTS message is not received, a transmission failure procedure is implemented (step 530).

If a CTS message is received, the AP 105 transmits the preamble, PLCP header and MAC header of a data packet (i.e., fragment) in a wide beam mode (step 535). The AP 105 then determines optimal antenna settings for communication with the WTRU (step 540). In step 545, the AP 105 configures the antenna for a narrow beam (i.e., focused) transmission and then, in step 550, the AP 105 transmits the remainder of the fragment. In step 555, the AP 105 configures the antenna back to the default (wide beam) configuration.

In step 560, the AP 105 waits to receive a CTS control message from the at least one WTRU via the wide beam antenna configuration a determination is made as to whether an ACK message was received from the WTRU. If an ACK message was not received, a transmission failure procedure is implemented (step 530). If an ACK message is received, a determination is made as to whether there are anymore fragments to transmit (step 565). If there is at least one additional fragment to transmit, the process 500 returns to step 535, whereby the AP 105 transmits the preamble, PLCP header and MAC header of a data packet (i.e., fragment) in a wide beam mode.

An AP 105 can also use its adaptive antenna for reception of data packets from a WTRU. In this case, the AP 105 only focuses its antenna when receiving the data packet. The AP 105 uses the wide beam for transmission of the CTS packet, if required, and for the ACK packet.

Figure 6:
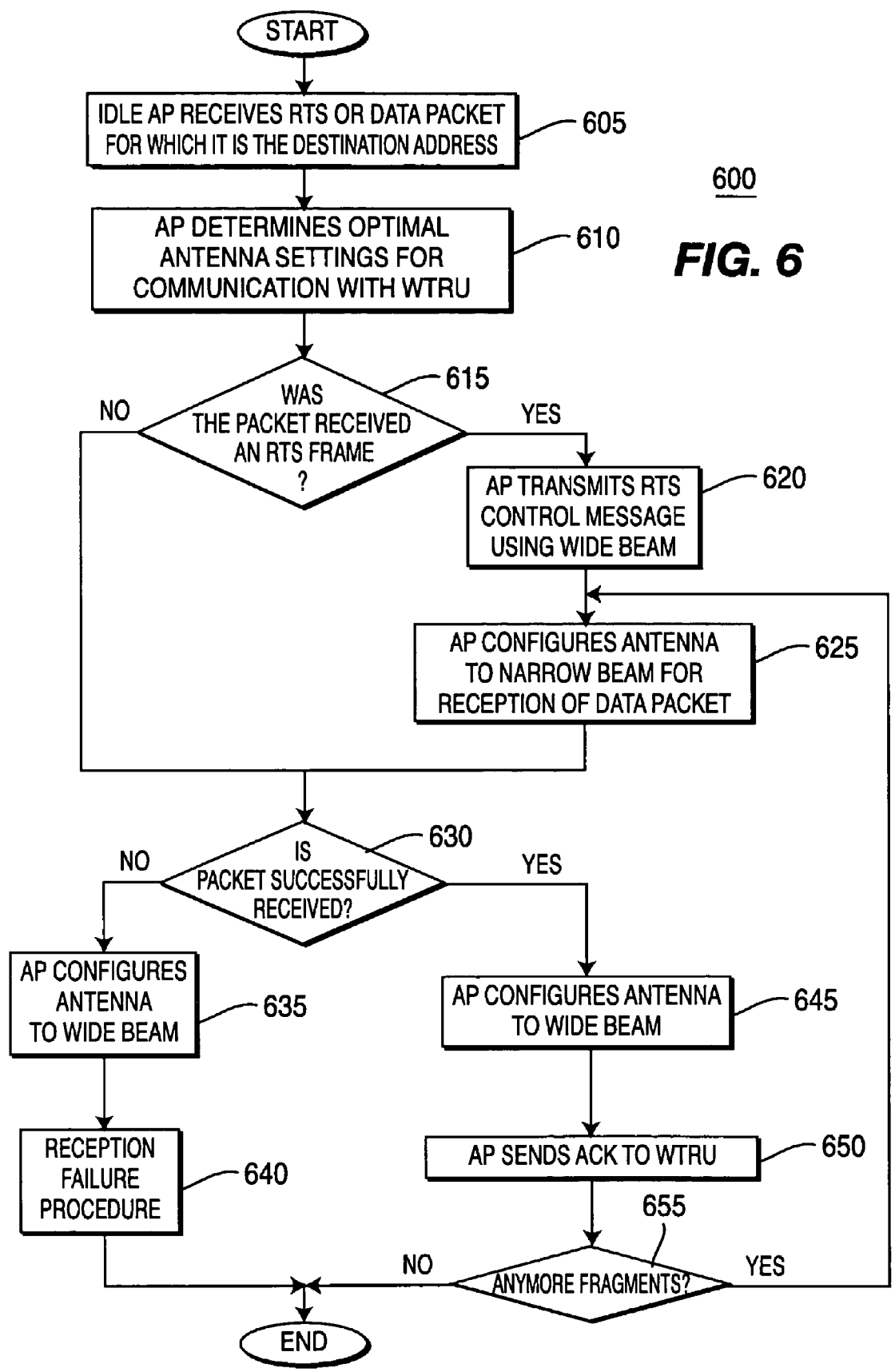
FIG. 6 is a flow chart depicting method steps used to implement AP reception with and without fragmentation in the system of FIG. 1 in accordance with the present invention.

FIG. 6 is a flow chart of a process 600 including method steps used to implement AP reception with and without fragmentation of data packets in accordance with the present invention. As depicted in FIG. 1, if WTRU 110 has data to send to the AP 105, it sends the RTS message in order to reserve the channel for the duration of transmission of the packet. Because the WTRU 120 is out of range of WTRU 110 (hidden terminal), WTRU 120 will not detect the RTS message sent by WTRU 110. However, by implementing the method steps of FIG. 6, the CTS packet is transmitted using a wide beam. Thus, the AP 105 ensures that WTRU 120 receives the CTS packet, allowing WTRU 120 to set its NAV to the duration of transmission of the data packet. The channel is then reserved for WTRU 110 for the transmission of its data packet.

Still referring to FIG. 6, an idle AP 105 receives an RTS or other message indicating that a data packet is waiting to be sent to the destination address of AP 105 (step 605). In step 610, the AP 105 determines optimal antenna settings for communication with the WTRU. In step 615, a determination is made as to whether an RTS frame was received. If it is determined in step 615 that an RTS frame was received, the AP 105 transmits a CTS control message using a wide beam (step 620) and then configures the antenna for narrow beam (i.e., focused) reception of a data packet (step 625). If it determined in step 615 that an RTS was not received, the AP 105 continues to use a wide beam antenna configuration for sending an ACK if the packet was successfully received.

In step 630, a determination is made as to whether or not a packet is successfully received by the AP 105. If a packet is not successfully received, the AP 105 configures the antenna to a wide beam (step 635) and a reception failure procedure is implemented (step 640). If a packet is successfully received, the AP 105 configures the antenna for wide beam (step 645) and sends an ACK message to the WTRU (step 650). In step 655, a determination is made as to whether there are any more fragments to transmit. If there is at least one additional fragment to transmit, the process 600 returns to step 625, whereby the AP 105 configures the antenna for narrow beam (i.e., focused) reception.

While the present invention has been described in terms of the preferred embodiment, other variations which are within the scope of the invention as outlined in the claims below will be apparent to those skilled in the art.

What is claimed is:

1. A wireless communication method for use by an access point (AP) having an antenna, the method comprising:
configuring the antenna to a wide beam configuration that covers a desired service area;
transmitting a Request-To-Send (RTS) control message via the wide beam antenna configuration;
waiting to receive a Clear-To-Send (CTS) control message via the wide beam antenna configuration;
wherein the RTS or CTS control message only provides first duration information regarding a duration needed to transmit a first portion of a data packet fragment that has first and second portions;
transmitting the first portion of the data packet fragment via the wide beam antenna configuration, wherein the first portion of the data packet fragment includes a preamble, a physical layer convergence protocol (PLCP) header and a medium access control (MAC) header of the data packet fragment, the MAC header including duration information regarding the second portion of the data packet fragment;
configuring the antenna to a narrow beam configuration; and
transmitting the second portion of the data packet fragment via the narrow beam antenna configuration.

2. The method of claim 1 further comprising:
performing a media access control (MAC) layer protocol for obtaining channel access prior to transmitting the RTS control message.

3. The method of claim 1 further comprising:
configuring the antenna to a wide beam configuration after the second portion of the data packet fragment is transmitted;
waiting to receive an acknowledgement message indicating that the data packet fragment was successfully received; and
processing additional data packet fragments if the acknowledgement message is received and there are additional data packet fragments available to be processed.

4. An AP configured to perform the method of claim 1.
5. An AP configured to perform the method of claim 2.
6. An AP configured to perform the method of claim 3.

* * * * *